United States Patent
Nakayama et al.

(10) Patent No.: US 12,503,031 B2
(45) Date of Patent: Dec. 23, 2025

(54) TEMPERATURE-REGULATING STORAGE SYSTEM

(71) Applicant: Toyota Motor Engineering & Manufacturing North America, Inc., Plano, TX (US)

(72) Inventors: David T. Nakayama, Canton, MI (US); Ryan C. Harris, Saline, MI (US); Peter C. Piper, Saline, MI (US); Matthew K. Killeen, Ypsilanti, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 393 days.

(21) Appl. No.: 18/203,883

(22) Filed: May 31, 2023

(65) Prior Publication Data
US 2024/0399949 A1 Dec. 5, 2024

(51) Int. Cl.
| B60P 3/00 | (2006.01) |
| B60H 1/00 | (2006.01) |
| B60P 3/20 | (2006.01) |

(52) U.S. Cl.
CPC .......... *B60P 3/205* (2013.01); *B60H 1/00271* (2013.01)

(58) Field of Classification Search
CPC ............................ B60H 1/00271; B60P 3/205
See application file for complete search history.

(56) References Cited

U.S. PATENT DOCUMENTS

| 4,311,420 | A | * | 1/1982 | Hendricks | B60P 7/0892 410/121 |
| 4,893,478 | A | * | 1/1990 | Kruck | F25D 23/063 62/298 |
| 5,170,605 | A | * | 12/1992 | Huddle | F25D 17/005 52/630 |
| 5,598,943 | A | | 2/1997 | Markus | |
| 6,012,885 | A | * | 1/2000 | Taylor | B60P 7/0892 410/121 |
| 6,176,657 | B1 | * | 1/2001 | Romph | B60P 7/0892 410/121 |
| 6,511,270 | B1 | * | 1/2003 | Burke | B60P 7/0807 410/97 |
| 8,887,896 | B1 | * | 11/2014 | Berthelsen | B65G 25/065 198/750.3 |
| 2010/0127032 | A1 | | 5/2010 | Schubring et al. | |

(Continued)

FOREIGN PATENT DOCUMENTS

DE       202006010896 U1    11/2007

*Primary Examiner* — Steven O Douglas
(74) *Attorney, Agent, or Firm* — Christopher G. Darrow; Darrow Mustafa PC (57) ABSTRACT

A storage system includes a storage surface for storing a container thereon. The storage surface defines a storage surface ridge. The storage surface ridge defines a cavity. The storage surface further defines a storage surface valley. The storage surface ridge and the storage surface valley interlock with a bottom surface of the container. The storage system also includes a temperature-regulating medium housed in the cavity. The temperature-regulating medium regulates a temperature of one or more contents of the container when the container is stored on the storage surface.

14 Claims, 4 Drawing Sheets

(56) References Cited

U.S. PATENT DOCUMENTS

2014/0305829 A1* 10/2014 Roesler .................. B25H 3/021
                                                                          206/511
2015/0183377 A1    7/2015  Ruffner et al.
2017/0297406 A1  10/2017  Wang

* cited by examiner

TEMPERATURE-REGULATING STORAGE SYSTEM

TECHNICAL FIELD

The present disclosure relates generally to temperature-regulating storage systems for vehicles and, more particularly, to a container for storing contents in a vehicle and a storage surface for regulating the contents of the container when the container is stored on the storage surface.

BACKGROUND

Vehicles have powerful heating, ventilation, and air conditioning (HVAC) systems. However, a cooler stored in a vehicle benefits little from cabin air to maintain the temperature of its contents and may rely on large volumes of ice or multiple heat packs for temperature regulation. A long trip in a vehicle may require multiple replenishments of ice or heat packs. Moreover, coolers have no convenient means to secure the cooler to the vehicle other than external tie-downs, which require dedicated connections in the vehicle's interior luggage compartment, or strategic placement of other cargo to prevent the cooler from moving.

SUMMARY

The present disclosure provides a storage system for a vehicle. The storage system includes a grooved floor in a compartment of the vehicle such as the trunk of the vehicle. The grooved floor prevents movement of a storage container when the container is stored on the floor. For example a cooler, having a grooved bottom surface interlocks with the grooved floor to prevent the container from sliding in the compartment. The grooved floor also provides temperature regulation of contents stored in the container, for example, food and beverages. For example, temperature-regulating medium flows beneath the floor to regulate the temperature of the contents of the container from below the container. The temperature-regulating medium flows through an HVAC system of the vehicle, which controls the temperature of the temperature-regulating medium to either cool or heat the contents of the container. As a result of the grooved floor and the temperature-regulating medium, the storage system prevents sliding of the container within the vehicle during driving and facilitates improved temperature regulation of contents of the container through interlocking of the container with the storage surface.

In one form of the present disclosure, a storage system is disclosed. The storage system includes a storage surface for storing a container thereon. The storage surface defines a storage surface ridge. The storage surface ridge defines a cavity. The storage surface further defines a storage surface valley. The storage surface ridge and the storage surface valley interlock with a bottom surface of the container. The storage system also includes a temperature-regulating medium housed in the cavity. The temperature-regulating medium regulates a temperature of one or more contents of the container when the container is stored on the storage surface.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

The present disclosure provides a storage system for a vehicle. As previously noted, providing storage within a vehicle may involve several difficulties. In particular, storage solutions do not generally provide the ability to directly regulate the temperature of stored goods and, moreover, storage containers have a tendency to move, which may result in damage to the vehicle or other stowed items. Accordingly, in at least one embodiment, a storage system is disclosed. The storage system includes a grooved floor in a compartment of the vehicle such as the trunk of the vehicle. The grooved floor provides for multiple advantages. Firstly, the grooved floor prevents movement of a storage container when the container is stored on the floor. For example a cooler, having a grooved bottom surface interlocks with the grooved floor to prevent the container from sliding in the compartment during driving of the vehicle. Second, the grooved floor provides temperature regulation of contents stored in the container. For example, temperature-regulating medium flows beneath the floor to regulate the temperature of the contents of the container from below the container. The vehicle also includes an HVAC system, and the temperature-regulating medium flows through the HVAC system, which controls the temperature of the temperature-regulating medium to either cool or heat the contents of the container. In this way, the storage system improves upon current vehicular storage systems through interlocking of the container with the storage surface to prevent sliding of the container within the vehicle during driving and to facilitate improved temperature regulation of contents of the container.

Figure 1:
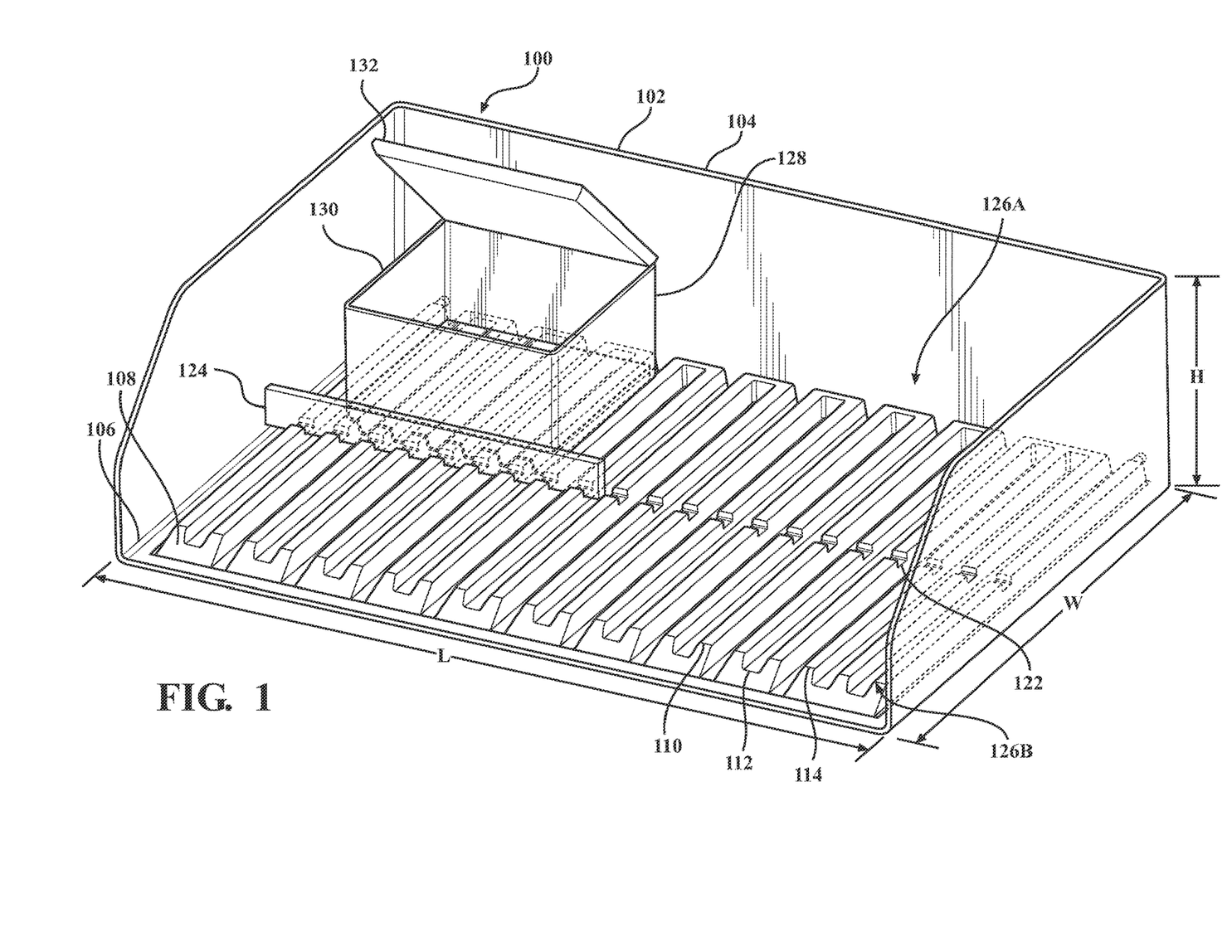
FIG. 1 shows a perspective view of an exemplary storage system.

Referring to FIG. 1, an exemplary storage system 100 for a vehicle 102 is shown. As described herein, the vehicle 102 is a car. In one or more arrangements, the car is a sedan, an SUV, or another type of passenger vehicle. In one or more other arrangements, the vehicle 102 is a motorhome, a trailer, a boat, etc. Among other components of the vehicle 102, the vehicle 102 includes a compartment 104. In one or more arrangements, the compartment 104 is a trunk of the vehicle 102, however, in one or more other arrangements, the compartment 104 is a front trunk (e.g., a frunk) of the vehicle 102, a passenger compartment of the vehicle 102, or another type of compartment within the vehicle 102. The compartment 104 defines a compartment length L, a compartment width W, and a compartment height H. In addition to the compartment 104, the vehicle 102 defines a floor 106. As shown, the floor 106 is a floor of the compartment 104.

In one or more arrangements, the storage system 100 is located within the compartment 104. In addition to the compartment 104, the storage system 100 includes a storage surface 108. In one or more arrangements, the storage surface 108 forms at least a portion of the floor 106. In one or more other arrangements, for example, as shown, the storage surface 108 is a separate component from the floor 106 that is placed on the floor 106. A user of the vehicle 102 can store items on the storage surface 108 within the compartment 104. For example, the user can store luggage, boxes, equipment, coolers, etc. on the storage surface 108. In one or more arrangements, the storage surface 108 is grooved. More specifically, in one or more arrangements, the storage surface 108 defines a storage surface ridge 110 and a storage surface valley 112. In one or more instances, the storage surface valley 112 is adjacent to the storage surface ridge 110. In the arrangements shown in the figures, the storage surface 108 defines a series of storage surface ridges 110 and a series of storage surface valleys 112. In one or more arrangements, for example, as shown, the storage surface ridges 110 and the storage surface valleys 112 are arranged in an alternating pattern. However, in one or more other arrangements, the storage surface ridges 110 and the storage surface valleys 112 may be arranged in other suitable arrangements.

The storage surface ridges 110 and the storage surface valleys 112 have shapes that can be represented in a cross-section. In one or more arrangements, for example, as shown, the storage surface ridges 110 and the storage surface valleys 112 have shapes of which the geometry, as shown in a cross-section, is complementary. In other words, the storage surface ridges 110 have substantially the same shape as the storage surface valleys 112. More specifically, in the arrangement shown, the storage surface ridges 110 have substantially the same shape as the storage surface valleys 112 when inverted. However, in one or more other arrangements, the storage surface ridges 110 and the storage surface valleys 112 may have non-complementary shapes. In other words, the storage surface ridges 110 and the storage surface valleys 112 have shapes of which the geometry, as shown in a cross-section, is not substantially similar.

In one or more arrangements, for example, as shown, the storage surface ridges 110 and the storage surface valleys 112 have substantially trapezoidal shapes. However, in one or more other arrangements, the storage surface ridges 110 and the storage surface valleys 112 have one or more other shapes, for example, substantially triangular shapes, substantially square shapes, substantially rectangular shapes, etc. In one or more arrangements, the storage surface ridges 110 define substantially flat upper surfaces 114, for example, in arrangements in which the storage surface ridges 110 have substantially trapezoidal, rectangular, or square shapes. In one or more arrangements in which the storage surface ridges 110 define substantially flat upper surfaces 114, the substantially flat upper surfaces 114 allow a user of the storage system 100 to store large items securely on the storage surface 108.

In one or more arrangements, for example, as shown, the storage surface ridges 110 and the storage surface valleys 112 extend along the floor 106 in a substantially longitudinal direction of the vehicle 102. As used herein, the longitudinal direction of the vehicle 102 refers to a direction along a longitudinal axis of the vehicle 102 (e.g., from the fore to the aft of the vehicle 102, from the front of the vehicle 102 to the back of the vehicle 102, etc.). In one or more other arrangements, the storage surface ridges 110 and the storage surface valleys 112 extend along the floor 106 in a substantially lateral direction of the vehicle 102. As used herein, the lateral direction of the vehicle 102 refers to a direction along a lateral axis of the vehicle 102 (e.g., from one side of the vehicle 102 to the other side of the vehicle 102). In still one or more other arrangements, the storage surface ridges 110 and the storage surface valleys 112 extend along the floor 106 in a direction that is not substantially longitudinal or lateral with respect to the vehicle 102 (e.g., the storage surface ridges 110 and the storage surface valleys 112 extend along the floor 106 in a diagonal direction with respect to the vehicle 102).

Figure 3:
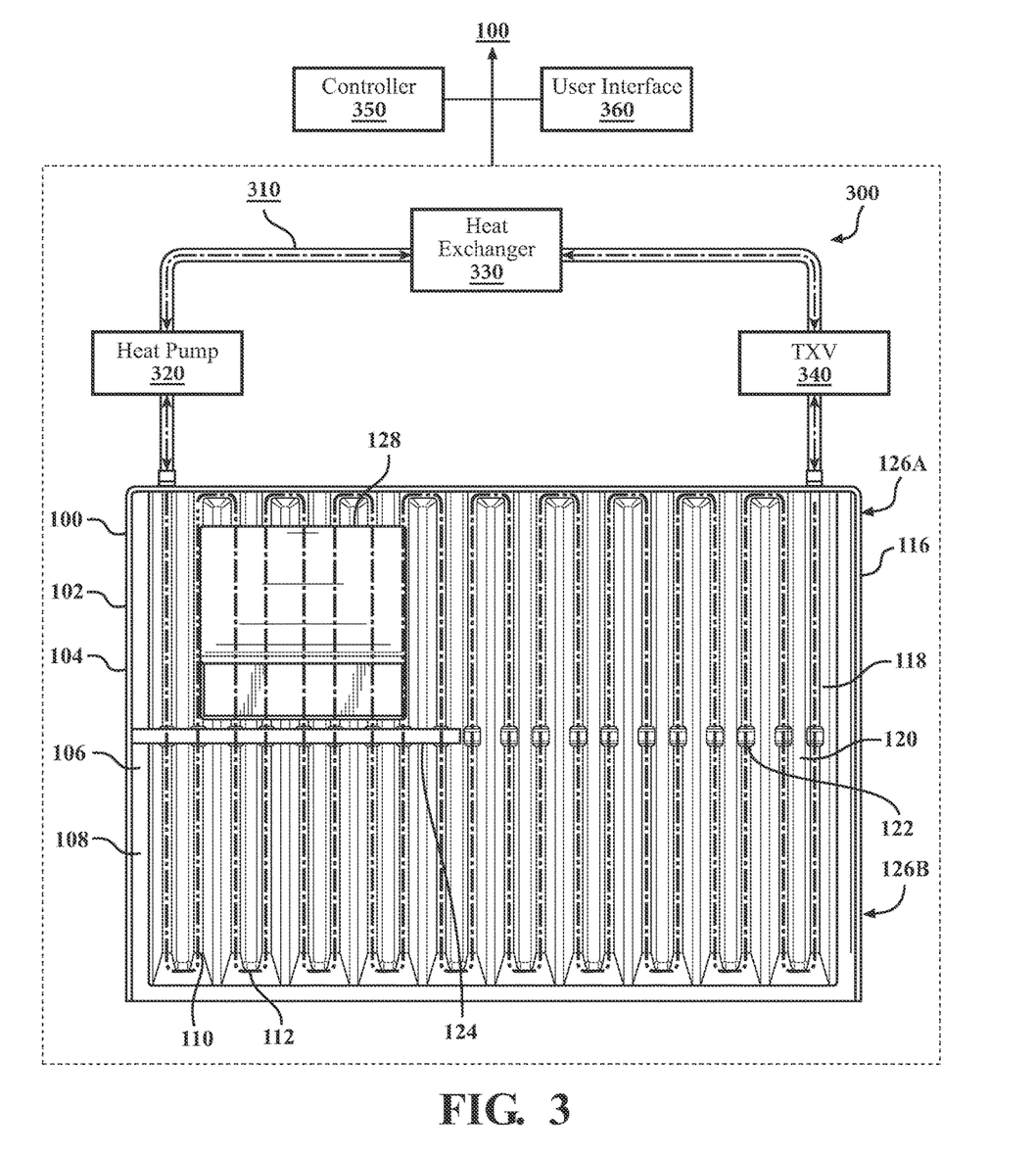
FIG. 3 shows a diagrammatic view of the storage system connected to an HVAC system of a vehicle.

With additional reference now to FIG. 3, in one or more instances, the storage surface 108 forms at least a portion of a floor of a bed 116 of a pickup truck having corrugations. More specifically, the compartment 104 can be the bed 116 of the pickup truck. In one or more arrangements, the corrugations of the bed 116 may define one or more bed ridges 118 and one or more bed valleys 120, and the bed ridges 118 may form the storage surface ridges 110, and the bed valleys 120 may form the storage surface valleys 112. In one or more arrangements, the bed ridges 118 and the bed valleys 120 extend along the bed 116 in a substantially longitudinal direction of the pickup truck. In one or more other arrangements, the bed ridges 118 and the bed valleys 120 extend along the bed 116 in a substantially lateral direction of the pickup truck. In still one or more other arrangements, the bed ridges 118 and the bed valleys 120 extend along the bed 116 in a direction that is not substantially longitudinal or lateral with respect to the pickup truck (e.g., the bed ridges 118 and the bed valleys 120 extend along the bed 116 in a diagonal direction with respect to the pickup truck). Moreover, in one or more arrangements in which the bed ridges 118 and the bed valleys 120 extend across the entire surface area of the bed 116, the storage surface 108 forms the entire bed 116. In one or more other arrangements in which the bed ridges 118 and the bed valleys 120 do not extend across the entire surface area of the bed 116, the storage surface 108 forms only a portion of the bed 116.

With continued reference to FIG. 1, in one or more arrangements, the storage surface 108 defines a slot 122. In one or more instances, for example, as shown, the slot 122 extends in a direction substantially perpendicular to the storage surface ridges 110 and the storage surface valleys 112. However, in one or more other instances, the slot 122 extends in a direction not substantially perpendicular to the storage surface ridges 110 and the storage surface valleys 112 (e.g., the slot 122 extends in a diagonal direction with respect to the storage surface ridges 110 and the storage surface valleys 112). In one or more arrangements, for example, as shown, the slot 122 extends along the entire compartment length L. However, in one or more other arrangements, the slot 122 extends along a portion of the compartment length L. In one or more instances, the slot 122 is configured to receive a divider 124.

Accordingly, in one or more arrangements, the storage system 100 includes a divider 124. In one or more instances, the divider 124 is located in the slot 122 and divides the storage surface 108 into two or more storage surface areas 126, for example, a first storage surface area 126A and a second storage surface area 126B. While the divider 124 is shown in FIG. 1 as dividing the storage surface 108 into two storage surface areas 126, in one or more other instances, the divider 124 divides the storage surface 108 into another suitable number of storage surface areas 126, for example, three storage surface areas 126, four storage surface areas 126, etc. Moreover, in one or more arrangements, for example, as shown, the divider 124 divides the storage surface 108 lengthwise with respect to the compartment 104 when the divider 124 is placed in the slot 122. In such arrangements, the divider 124 defines a length that is substantially equal to or less than the length of the storage surface 108. However, in one or more other arrangements, the divider 124 can be placed in the storage surface valleys 112 to divide the storage surface 108 widthwise with respect to the compartment 104. In such arrangements, the divider 124 defines a length that is substantially equal to or less than the width of the storage surface 108.

Figure 2A:
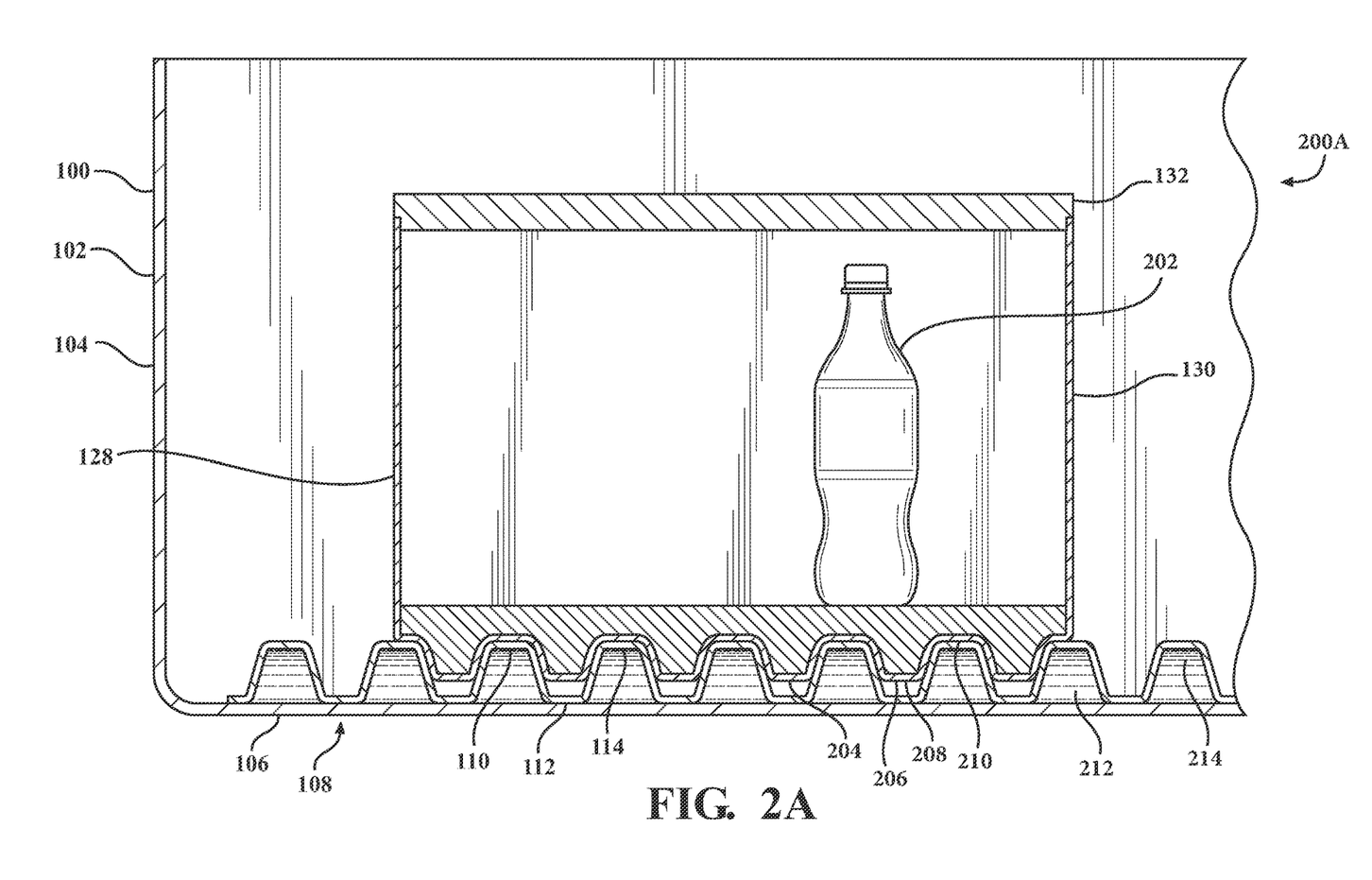
FIG. 2A shows a first example of a cross-sectional view of the storage system.
Figure 2B:
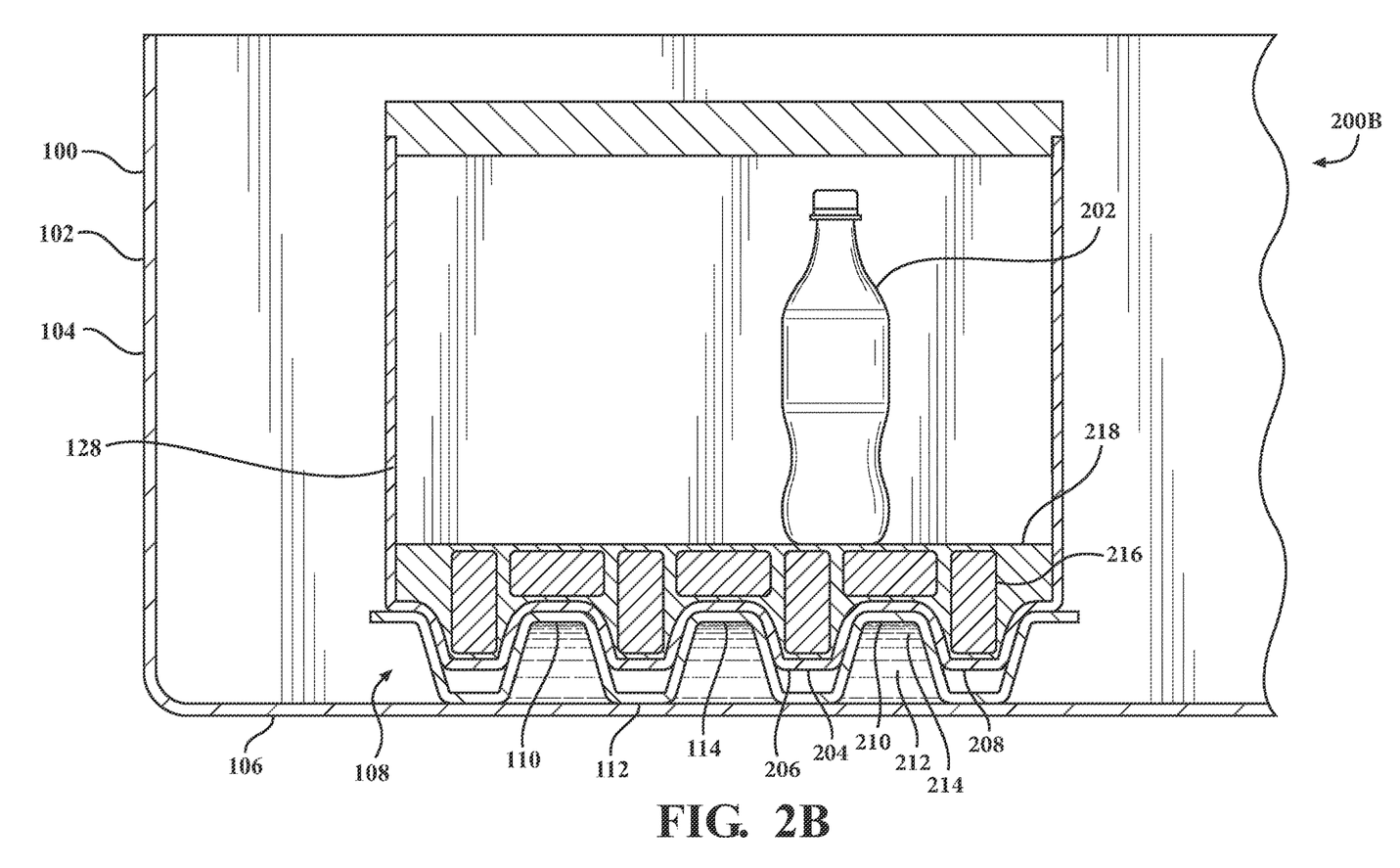
FIG. 2B shows a second example of a cross-sectional view of the storage system.

With continued reference to FIGS. 1-2B, the storage system 100 also includes a container 128. In one or more arrangements, the container 128 is a cooler used to store one or more contents 202 (e.g., beverages, food items, etc.) and regulate the temperature of those contents 202. In one or more other arrangements, the container 128 is another suitable type of container, for example, a storage bin, a dry storage container, a refrigerated ISO container, etc. In one or more instances, the container 128 is sized and shaped to store one or more contents 202 that may need to be kept cold or hot during use of the vehicle 102. Moreover, in one or more instances, the container 128 is stored on the floor 106. More specifically, the container 128 is stored on the storage surface 108. In one or more arrangements, the container 128 is portable and removable from the vehicle 102 so that a user of the storage system 100 can carry the container 128 to and from the vehicle 102, for example, to the user's house to load contents 202 into the container 128 to take into the vehicle 102.

In one or more arrangements, the container 128 defines four sides 130, a top 132, and a bottom 204, shown in FIGS. 2A and 2B. Additionally, the container 128 defines a container length $L_C$, a container width $W_C$, and a container height $H_C$. The bottom 204 defines a bottom surface 206 facing the storage surface 108. In one or more arrangements, the bottom surface 206 is grooved. More specifically, referring to FIGS. 2A and 2B, the bottom surface 206 defines a container ridge 208 and a container valley 210. In one or more instances, the container valley 210 is adjacent to the container ridge 208. In one or more arrangements, for example, as shown, the bottom surface 206 defines a series of container ridges 208 and a series of container valleys 210. In one or more instances, for example, as shown, the container ridges 208 and the container valleys 210 are arranged in an alternating pattern. However, in one or more other instances, the container ridges 208 and the container valleys 210 may be arranged in other suitable arrangements dependent on the arrangement of the storage surface ridges 110 and the storage surface valleys 112 that allow the bottom surface 206 to interlock with the storage surface 108.

The container ridges 208 and the container valleys 210 have shapes that can be represented in a cross-section. In one or more arrangements, for example, as shown, the container ridges 208 and the container valleys 210 have shapes of which the geometry, as shown in a cross-section, is complementary. In other words, the cross-sections of the container ridges 208 have substantially the same shape as the cross-sections of the container valleys 210. Moreover, in the arrangement shown, the container ridges 208 have substantially the same shape as the container valleys 210 when inverted. However, in one or more other arrangements, the container ridges 208 and the container valleys 210 may have non-complementary shapes. In other words, the container ridges 208 and the cross-sections of the container valleys 210 have shapes of which the geometry, as shown in a cross-section, is not substantially similar.

In one or more arrangements, for example, as shown, the container ridges 208 and the container valleys 210 have substantially trapezoidal shapes. However, in one or more other arrangements, the container ridges 208 and the container valleys 210 have one or more other shapes, for example, substantially triangular shapes, substantially square shapes, substantially rectangular shapes, etc.

In one or more arrangements, for example, as shown, the container ridges 208 and the container valleys 210 extend across the bottom of the container 128 in a substantially longitudinal direction of the container 128. As used herein, the longitudinal direction of the container 128 refers to a direction along the container length $L_C$. In one or more other arrangements, the container ridges 208 and the container valleys 210 extend across the bottom of the container 128 in a substantially lateral direction of the container 128. As used herein, the lateral direction of the container 128 refers to a direction along the $W_C$. In still one or more other arrangements, the container ridges 208 and the container valleys 210 extend across the bottom of the container 128 in a direction that is not substantially longitudinal or lateral with respect to the container 128 (e.g., the container ridges 208 and the container valleys 210 extend across the bottom of the container 128 in a diagonal direction with respect to the container 128).

In one or more arrangements, when the container 128 is placed on the storage surface 108, the bottom surface 206 mates with the storage surface 108. More specifically, when the container 128 is placed on the storage surface 108, the storage surface ridges 110 mate with the container valleys 210, and the storage surface valleys 112 mate with the container ridges 208. As used herein, mating of the storage surface 108 with the bottom surface 206 means that the storage surface 108 and the bottom surface 206 contact each other to facilitate thermal coupling. In other words, the bottom surface 206 is configured to interlock with the storage surface 108. The interlocking of the bottom surface 206 with the storage surface 108 helps prevent the container 128 from sliding or otherwise moving with respect to the floor 106 during driving. For example, the interlocking of the bottom surface 206 with the storage surface 108 prevents the container 128 from moving with respect to the floor 106 in a longitudinal direction of the vehicle 102 or in a lateral direction of the vehicle 102. More specifically, in arrangements in which the container ridges 208, the container valleys 210, the storage surface ridges 110, and the storage surface valleys 112 extend longitudinally with respect to the vehicle 102, the interlocking of the bottom surface 206 with the storage surface 108 prevents the container 128 from moving laterally with respect to the floor 106. Similarly, in arrangements in which the container ridges 208, the container valleys 210, the storage surface ridges 110, and the storage surface valleys 112 extend laterally with respect to the vehicle 102, the interlocking of the bottom surface 206 with the storage surface 108 prevents the container 128 from moving longitudinally with respect to the floor 106.

With additional reference now to FIG. 2A, showing a first example 200A of a cross-section of the storage system 100, in one or more arrangements, each of the storage surface ridges 110 defines a cavity 212. In the arrangements shown, the series of storage surface ridges 110 are connected and define a cavity 212 that zig-zags across the storage surface 108. In one or more instances, a temperature-regulating medium 214 is housed in the cavity 212. In one or more instances, the temperature-regulating medium 214 is a suitable temperature-regulating medium 214, for example, coolant, water, etc. The temperature-regulating medium 214 can take a suitable form, for example, liquid or gas. In one or more arrangements, the temperature-regulating medium 214 flows through the cavity 212 and regulates the temperature of the contents 202 of the container 128 from below when the container 128 is stored on the storage surface 108. Accordingly, the grooved storage surface 108 not only prevents the container 128 from sliding with respect to the floor 106, but also increases the surface area of the storage surface 108 for temperature regulation compared to a flat, non-grooved storage surface.

Referring now to FIG. 3, in addition to the storage system 100, in one or more arrangements, the vehicle 102 includes a heating, ventilation, and air conditioning (HVAC) system 300. In one or more arrangements, in addition to other components of the HVAC system 300, the HVAC system 300 includes a pipe 310, a heat pump 320, a heat exchanger 330, and a thermostatic expansion valve (TXV) 340. The pipe 310 is fluidly connected to the cavity 212 and facilitates passage of the temperature-regulating medium 214 through the heat pump 320, the heat exchanger 330, the TXV 340, and the storage surface 108.

In one or more arrangements, the HVAC system 300 controls the temperature of the temperature-regulating medium 214 to a cool temperature. As used herein, a cool temperature is a temperature suitable for keeping the contents 202 of the cooler frozen or refrigerated. For example, a cold temperature is a temperature from about 30 degrees fahrenheit (° F.) to about 40° F. Accordingly, the temperature-regulating medium 214 either cools the contents 202 of the container 128 or maintains the contents 202 of the container 128 at a substantially constant, cool temperature.

Additionally or alternatively, in one or more arrangements, the HVAC system 300 controls the temperature of the temperature-regulating medium 214 to a warm temperature. As used herein, a warm temperature is a temperature suitable for keeping the contents 202 of the cooler at a warm, food-safe temperature. For example, a warm temperature is a temperature from about 100° F. to about 200° F. Accordingly, the temperature-regulating medium 214 either warms the contents 202 of the container 128 or maintains the contents 202 of the container 128 at a substantially constant, warm temperature.

In one or more arrangements, to cool the temperature-regulating medium 214, the temperature-regulating medium 214 flows through the HVAC system 300 in a direction corresponding to a clockwise direction with respect to FIG. 3. In one or more instances, the temperature-regulating medium 214 starts out as a low-pressure gas and/or vapor and first flows through the heat pump 320. The heat pump 320 compresses the temperature-regulating medium 214 such that the temperature-regulating medium 214 can later expand and absorb heat. In other words, the heat pump 320 changes the pressure and/or state of the temperature-regulating medium 214. For example, the heat pump 320 compresses the temperature-regulating medium 214 from a low-pressure gas and/or vapor into a high-pressure gas and/or vapor such that the temperature-regulating medium 214 can later expand into a gas. In one or more arrangements, the temperature-regulating medium 214 next flows through the heat exchanger 330. In one or instances, the heat exchanger 330 changes the phase of the temperature-regulating medium 214. For example, the heat exchanger 330 cools the temperature-regulating medium 214 from a high-pressure gas and/or vapor into a high-pressure liquid. In one or more arrangements, the temperature-regulating medium 214 next flows through the TXV 340. In one or more instances, the TXV 340 changes the pressure of the temperature-regulating medium 214. For example, the TXV 340 changes the pressure of the temperature-regulating medium 214 from a high-pressure liquid into a low-pressure liquid. Accordingly, low-pressure liquid flows through the cavity 212 and absorbs heat from the storage surface 108. As the low-pressure liquid flows through the cavity 212, it absorbs heat and transforms into a low-pressure gas. Accordingly, the storage surface 108 functions as an evaporator to cool items stored on the storage surface 108 such as the container 128.

In one or more arrangements, to heat the temperature-regulating medium 214, the temperature-regulating medium 214 flows through the HVAC system 300 in a direction corresponding to a counterclockwise direction with respect to FIG. 3. In one or more instances, the temperature-regulating medium 214 starts out as low-pressure gas and/or vapor and first flows through the heat pump 320. The heat pump 320 compresses the temperature-regulating medium 214 from a low-pressure gas and/or vapor to a high-pressure gas and/or vapor so that the temperature-regulating medium 214 can condense into a liquid and later release heat. The temperature-regulating medium 214 then flows through the cavity 212 and releases heat as the temperature-regulating medium 214 condenses into a high-pressure liquid. As the temperature-regulating medium 214 releases heat, the storage surface 108 functions as a condenser and heats items stored on the storage surface 108 such as the container 128. In one or more arrangements, the temperature-regulating medium 214 then flows through the TXV 340. The TXV 340 changes the pressure of the temperature-regulating medium 214 from a high-pressure liquid to a low-pressure liquid. The low-pressure liquid then flows through the heat exchanger 330. The heat exchanger 330 changes the phase of the temperature-regulating medium 214. For example, the heat exchanger 330 changes the temperature-regulating medium 214 from a low-pressure liquid to a low-pressure gas.

With continued reference to FIG. 3, the HVAC system 300 also includes a controller 350. The controller 350 is connected to the HVAC system 300 and controls the temperature of the temperature-regulating medium 214 as it flows through the HVAC system 300. For example, the controller 350 is communicatively connected to the components of the HVAC system 300 and operates the components of the HVAC system 300 to control the temperature-regulating medium 214 to flow clockwise through the HVAC system 300 to cool the contents 202 of the container 128 or flow counterclockwise through the HVAC system 300 to heat the contents 202 of the container 128. The controller 350 can be dedicated to operating the HVAC system 300 or could additionally support the operation of other systems of the vehicle 102. In one or more arrangements, the controller 350 includes a processor communicatively coupled with a memory. The processor includes a device capable of executing machine-readable instructions, which may be stored on a non-transitory computer-readable medium, for example, the memory. The processor includes an integrated circuit, a microchip, a computer, and/or another suitable computing device. In one or more arrangements, the memory includes a computer readable medium suitable for storing data and algorithms. For example, the memory includes RAM, ROM, a flash memory, a hard drive, and/or any device capable of storing machine readable instructions. In one or more instances, various algorithms and data for operating the HVAC system 300 reside in whole or in part in the memory. For example, the controller 350 includes a module residing in memory for operating HVAC system 300.

In addition to the controller 350, in one or more arrangements, the HVAC system 300 also includes a user interface 360. In one or more arrangements, the user interface 360 is a screen, however, in one or more other arrangements, the user interface 360 includes one or more buttons, one or more switches, etc. In still other arrangements, the user interface 360 is a smart phone or a tablet. The user interface 360 may be located in or on the vehicle 102 or may be located separately from the vehicle 102. In arrangements in which the user interface 360 is located on the vehicle 102, the user interface 360 can be located on a dashboard or instrument panel of the vehicle 102. In one or more arrangements, the user interface 360 is configured to receive an input from a user of the vehicle 102 and/or the storage system 100. For example, the user interface 360 is configured to receive an ON/OFF input and/or a temperature input from the user. The ON/OFF input instructs the controller 350 to turn the HVAC system 300 on and off, respectively, and the temperature input instructs the controller 350 to operate the HVAC system 300 to control the temperature of the temperature-regulating medium 214 according to the temperature input.

With reference now to FIG. 2B, showing a second example 200B of a cross-section of the storage system 100, in one or more arrangements, the container 128 includes one or more temperature-regulating pack(s) 216 to further improve temperature regulation of the contents 202 of the container 128. In one or more instances, the temperature-regulating pack(s) 216 include one or more cooling pack(s) for cooling the contents 202 of the container 128 and/or maintaining the contents 202 of the container 128 at a cool temperature. The cooling pack(s) include a material suitable for maintaining a cool temperature, for example, water, phase-changing medium, paraffin wax, refrigerant, etc. In one or more other instances, the temperature-regulating pack(s) 216 include one or more heating pack(s) for heating the contents 202 of the container 128 and/or maintaining the contents 202 of the container 128 at a warm temperature. The heating pack(s) include a material suitable for maintaining a warm temperature, for example, water, phase-changing medium, calcium chloride, magnesium sulfate, etc. In arrangements in which the container 128 includes temperature-regulating pack(s) 216, the temperature-regulating medium 214 is configured to regulate the temperature of the temperature-regulating pack(s) 216, thereby regulating the temperature of the contents 202 of the container 128.

In one or more instances, the temperature-regulating pack(s) 216 are stored in a bottom area of the container 128 and/or are stored in contact with an inner surface of the container 128. Moreover, in one or more arrangements, the container 128 include a shelf 218. The shelf 218 is removable from the container 128. In one or more instances in which the container 128 includes the shelf 218, the temperature-regulating pack(s) 216 are stored under the shelf 218, and the contents 202 of the container 128 are stored on the shelf 218.

The variations described herein have the advantage of providing a temperature-regulating storage system for a vehicle. The arrangements herein provide a container for storing one or more contents in a vehicle and for regulating the temperature of those contents using an HVAC system of the vehicle. The arrangements herein provide a storage surface for the container that facilitates temperature regulation and also prevents the container from sliding within the vehicle.

The preceding description is merely illustrative in nature and is in no way intended to limit the disclosure, its application, or uses. Work of the presently named inventors, to the extent it may be described in the background section, as well as aspects of the description that may not otherwise qualify as prior art at the time of filing, are neither expressly nor impliedly admitted as prior art against the present technology.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

The term "substantially" and/or "about," as used herein, include exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degrees/percent/units or less. In some examples, "substantially" can include being within normal manufacturing tolerances.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one variation, or various variations, means that a particular feature, structure, or characteristic described in connection with a form, a variation, or a particular system is included in at least one variation or form. The appearances of the phrase "in one variation" (or variations thereof) are not necessarily referring to the same variation or form. It should also be understood that the various method steps discussed herein do not have to be carried out in the same order as depicted, and not each method step is required in each variation or form.

The foregoing description of the forms and variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

What is claimed is:

1. A storage system, comprising:
    a storage surface for storing a container thereon, the storage surface defining a storage surface ridge, the storage surface ridge defining a cavity, the storage surface further defining a storage surface valley, wherein the storage surface ridge and the storage surface valley interlock with a bottom surface of the container; and
    a temperature-regulating medium housed in the cavity that regulates a temperature of one or more contents of the container when the container is stored on the storage surface.

2. The storage system of claim 1, wherein the storage surface ridge and the storage surface valley have complementary shapes.

3. The storage system of claim 1, wherein the bottom surface of the container defines a container ridge and a container valley, wherein the storage surface ridge mates with the container valley and the storage surface valley mates with the container ridge, whereby the bottom surface interlocks with the storage surface.

4. The storage system of claim 3, wherein at least one of the container ridge, the container valley, the storage surface ridge, and the storage surface valley have a substantially trapezoidal shape.

5. The storage system of claim 1, wherein the storage surface forms at least a portion of a floor of a vehicle, and wherein, when the bottom surface of the container interlocks with the storage surface, the storage surface prevents the container from moving with respect to the storage surface during driving of the vehicle.

6. The storage system of claim 1, wherein the storage surface forms at least a portion of a floor of a vehicle, and further comprising:
    an HVAC system for the vehicle, wherein the temperature-regulating medium flows through the HVAC system; and
    a controller connected to the HVAC system that controls the temperature of the temperature-regulating medium as it flows through the HVAC system.

7. The storage system of claim 6, wherein the controller controls the temperature of the temperature-regulating medium to a cool temperature, and wherein the temperature-regulating medium at least one of cools the contents of the container and maintains the contents of the container at a cool temperature.

8. The storage system of claim 6, wherein controller controls the temperature of the temperature-regulating medium to a warm temperature, and wherein the temperature-regulating medium at least one of heats the contents of the container and maintains the contents of the container at a warm temperature.

9. The storage system of claim 1, wherein the container includes a temperature-regulating pack stored in contact with an inner surface of the container, and wherein the temperature-regulating medium at least one of heats the temperature-regulating pack and cools the temperature-regulating pack to improve temperature regulation of the contents of the container.

10. The storage system of claim 9, wherein the container includes a removable shelf, wherein the temperature-regulating pack is stored underneath the removable shelf, and wherein the one or more contents of the container are stored on the removable shelf.

11. The storage system of claim 1, wherein the storage surface defines a slot and further comprising:
    a divider located in the slot and configured to divide the storage surface into two or more storage surface areas.

12. The storage system of claim 1, wherein the storage surface valley is one of a series of storage surface valleys, wherein the storage surface ridge is one of a series of storage surface ridges, wherein the storage surface ridges and the storage surface valleys are arranged in an alternating pattern.

13. The storage system of claim 12, wherein the storage surface forms at least a portion of a floor of a vehicle, and wherein the series of storage surface ridges and the series of storage surface valleys extend along the vehicle floor in a longitudinal direction of the vehicle.

14. The storage system of claim 12, wherein the storage surface forms at least a portion of a truck bed and wherein the series of storage surface ridges and the series of storage surface valleys form at least a portion of one or more corrugations of the truck bed.

* * * * *